United States Patent
Jin et al.

(10) Patent No.: US 10,330,975 B2
(45) Date of Patent: Jun. 25, 2019

(54) REFLECTIVE DISPLAY PANEL, DRIVING METHOD THEREOF, CONTROL METHOD OF PIXEL UNIT, AND REFLECTIVE DISPLAY DEVICE

(71) Applicant: BOE TECHNOLOGY GROUP CO., LTD., Beijing (CN)

(72) Inventors: Zhihe Jin, Beijing (CN); Seungwoo Han, Beijing (CN); Mingfu Han, Beijing (CN); Xing Yao, Beijing (CN); Guangliang Shang, Beijing (CN); Zhichong Wang, Beijing (CN); Lijun Yuan, Beijing (CN); Haoliang Zheng, Beijing (CN); Yunsik Im, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/794,298

(22) Filed: Oct. 26, 2017

(65) Prior Publication Data
US 2018/0188562 A1 Jul. 5, 2018

(30) Foreign Application Priority Data
Jan. 4, 2017 (CN) .......................... 2017 1 0004907

(51) Int. Cl.
*G02F 1/133* (2006.01)
*G02F 1/13357* (2006.01)
*G02F 1/1335* (2006.01)
*G02F 1/1343* (2006.01)
*G02F 1/19* (2019.01)

(52) U.S. Cl.
CPC ........ *G02F 1/1336* (2013.01); *G02F 1/13306* (2013.01); *G02F 1/13439* (2013.01); *G02F 1/133553* (2013.01); *G02F 1/134309* (2013.01); *G02F 1/19* (2013.01); *G02F 2001/133616* (2013.01); *G02F 2001/133618* (2013.01); *G02F 2201/12* (2013.01); *G02F 2202/10* (2013.01);
(Continued)

(58) Field of Classification Search
CPC ............... G02F 1/1336; G02F 1/13306; G02F 1/133553
USPC ........................................ 349/113
See application file for complete search history.

(56) References Cited

U.S. PATENT DOCUMENTS

2002/0154257 A1* 10/2002 Iijima ............... G02F 1/133514
349/67

FOREIGN PATENT DOCUMENTS

CN 1690785 A 11/2005

OTHER PUBLICATIONS

Office Action dated Oct. 31, 2018 issued in corresponding Chinese Application No. 201710004907.9.

* cited by examiner

*Primary Examiner* — Thanh Nhan P Nguyen
(74) *Attorney, Agent, or Firm* — Nath, Goldberg & Meyer; Joshua B. Goldberg (57) ABSTRACT

The present application discloses a reflective display panel, a driving method thereof, a control method of a pixel unit and a reflective display device. The reflective display panel comprises: a base substrate, a reflective layer, first and second electrode layers, wherein the first electrode layer is on a side of the reflective layer distal to the base substrate, the second electrode layer is on a side of the first electrode layer distal to the base substrate and insulated from the first electrode layer, materials of the first and second electrode layers are each an electro-optic material, and orthogonal
(Continued)

projections of the second and first electrode layers on the base substrate have overlapping areas corresponding to the pixel units.

13 Claims, 4 Drawing Sheets

(52) U.S. Cl.
 CPC .... *G02F 2202/101* (2013.01); *G02F 2203/02* (2013.01)

FIG. 5 applying driving voltages to the parts of the first electrode layer and the second electrode layer corresponding to the pixel unit such that refracted light generated after ambient light is refracted into the reflective display panel at the surface of the part of the second electrode layer corresponding to the pixel unit, reflected by the reflective layer and refracted out from the surface of the part of the second electrode layer corresponding to the pixel unit has a third phase ~S1

FIG. 6 applying a first driving voltage to the first strip-like electrodes one by one, and applying a second driving voltage to each of the second strip-like electrodes every time one of the strip-like electrodes is applied with the first driving voltage such that refracted light generated after ambient light is refracted into the reflective display panel at surfaces of the second strip-like electrodes applied with the second driving voltage, reflected by the reflective layer and refracted out from the surfaces of the second strip-like electrodes applied with the second driving voltage has a third phase ~ S2

FIG. 7

REFLECTIVE DISPLAY PANEL, DRIVING METHOD THEREOF, CONTROL METHOD OF PIXEL UNIT, AND REFLECTIVE DISPLAY DEVICE

CROSS-REFERENCE TO RELATED APPLICATION

This application claims priority to Chinese Patent Application No. 201710004907.9, filed on Jan. 4, 2017, the contents of which are incorporated by reference in the entirety.

TECHNICAL FIELD

The present disclosure relates to the field of display technology, and particularly relates to a reflective display panel, a driving method thereof, a control method of a pixel unit and a reflective display device.

BACKGROUND

In the field of display technology, displays can be roughly categorized, depending on the types of light sources used therein, into three types, namely, transmissive displays, reflective displays, and transflective displays. Among them, the reflective displays have a super power-saving feature because there is no need to provide a backlight module to serve as the light source.

SUMMARY

The present disclosure is intended to at least partially solve one of the technical problems existing in the prior art, and provides a reflective display panel, a driving method thereof, a control method of a pixel unit and a reflective display device.

In one aspect, the present disclosure provides a reflective display panel, having a plurality of pixel units and including:

a base substrate;

a reflective layer on a side of the base substrate;

a first electrode layer on a side of the reflective layer distal to the base substrate, a material of the first electrode layer being an electro-optic material; and a second electrode layer on a side of the first electrode layer distal to the base substrate and insulated from the first electrode layer, a material of the second electrode layer being an electro-optic material, wherein an orthogonal projection of the second electrode layer on the base substrate and an orthogonal projection of the first electrode layer on the base substrate overlap to form overlapping areas each corresponding to one of the plurality of pixel units.

Optionally, the first electrode layer includes a number of first strip-like electrodes parallel to each other;

the second electrode layer includes a number of second strip-like electrodes parallel to each other; and the first strip-like electrodes intersect with the second strip-like electrodes.

Optionally, the first strip-like electrodes are perpendicular to the second strip-like electrodes.

Optionally, the reflective display panel further includes:

a first driving unit connected to the first electrode layer and configured to output a first driving voltage to the first electrode layer; and a second driving unit connected to the second electrode layer and configured to output a second driving voltage to the second electrode layer.

Optionally, the material of the first electrode layer includes at least one of lithium niobate and gallium arsenide.

Optionally, the material of the second electrode layer includes at least one of lithium niobate and gallium arsenide.

Optionally, an insulating layer is provided between the first electrode layer and the second electrode layer.

Optionally, the reflective display panel further includes a pixel define layer on a side of the reflective layer distal to the base substrate, the pixel define layer defining the plurality of pixel units.

Optionally, for each of the plurality of pixel units, when parts of the first electrode layer and the second electrode layer corresponding to the pixel unit are applied with no driving voltages, reflected light having a first phase is generated after part of ambient light is reflected by a surface of the part of the second electrode layer corresponding to the pixel unit, and refracted light having a second phase is generated after part of ambient light is refracted into the reflective display panel at the surface of the part of the second electrode layer corresponding to the pixel unit, reflected by the reflective layer and refracted out from the surface of the part of the second electrode layer corresponding to the pixel unit, and thicknesses of the first electrode layer, the second electrode layer and the pixel define layer are set such that a phase difference between the first phase and the second phase is an even multiple of $\pi$ or an odd multiple of $\pi$.

In another aspect, the present disclosure provides a reflective display device including the reflective display panel as described above.

In still another aspect, the present disclosure provides a control method of a pixel unit in a reflective display panel, the reflective display panel being the reflective display panel as described above, wherein for any pixel unit in the reflective display panel, reflected light having a first phase is generated after part of ambient light is reflected by a surface of a part of the second electrode layer corresponding to the pixel unit; and when a part of the first electrode layer corresponding to the pixel unit and the part of the second electrode layer corresponding to the pixel unit are applied with no driving voltages, refracted light having a second phase is generated after part of ambient light is refracted into the reflective display panel at the surface of the part of the second electrode layer corresponding to the pixel unit, reflected by the reflective layer and refracted out from the surface of the part of the second electrode layer corresponding to the pixel unit, the first phase and the second phase having a first phase difference therebetween; and the control method of a pixel unit includes:

applying driving voltages to the parts of the first electrode layer and the second electrode layer corresponding to the pixel unit such that refracted light having a third phase is generated after part of ambient light is refracted into the reflective display panel at the surface of the part of the second electrode layer corresponding to the pixel unit, reflected by the reflective layer and refracted out from the surface of the part of the second electrode layer corresponding to the pixel unit, the first phase and the third phase having a second phase difference therebetween;

wherein one of the first phase difference and the second phase difference is an odd multiple of $\pi$, and the other is an even multiple of $\pi$.

In another aspect, the present disclosure further provides a driving method. of a reflective display panel, the reflective display panel is the above-described reflective display panel, the first electrode layer includes a number of first strip-like electrodes parallel to each other; the second electrode layer includes a number of second strip-like electrodes parallel to each other; and the first strip-like electrodes intersect with the second strip-like electrodes;

reflected light having a first phase is generated after part of ambient light is reflected by a surface of the second electrode layer;

when parts of the first electrode layer and the second electrode layer corresponding to the pixel unit are applied with no driving voltages, refracted light having a second phase is generated after part of ambient light is refracted into the reflective display panel at the surface of the second electrode layer, reflected by the reflective layer and refracted out from the second electrode layer, the first phase and the second phase having a first phase difference therebetween;

the driving method of the reflective display panel includes:

applying a first driving voltage to the first strip-like electrodes one by one, and applying a second driving voltage to each of the second strip-like electrodes every time one of the strip-like electrodes is applied with the first driving voltage such that refracted light having a third phase is generated after part of ambient light is refracted into the reflective display panel at surfaces of the second strip-like electrodes applied with the second driving voltage, reflected by the reflective layer and refracted out from the surfaces of the second strip-like electrodes applied with the second driving voltage, the first phase and the third phase having a second phase difference therebetween;

wherein one of the first phase difference and the second phase difference is an odd multiple of π, and the other is an even multiple of π.

DETAILED DESCRIPTION OF THE EMBODIMENTS

To enable those skilled in the art to better understand technical solutions of the present disclosure, a reflective display panel, a driving method thereof, a control method of a pixel unit and a reflective display device provided in the present disclosure will be described in detail below in conjunction with the accompanying drawings.

An existing reflective display is generally based on a liquid crystal cell, which comprises a first substrate and a second substrate disposed opposite to each other, the first substrate and the second substrate being provided thereon with control electrodes for controlling deflection of liquid crystal molecules, and a reflective film is provided on a lower surface of the liquid crystal cell.

A pixel area on the liquid crystal cell is taken as an example. When the pixel area does not need to perform display, a switching transistor in the pixel area is in off state, a driving voltage cannot be input to the corresponding control electrode, in this case, the pixel area presents a dark state, ambient light cannot enter into the pixel area, and thus the pixel area does not perform display. When the pixel area needs to perform display, the switching transistor in the pixel area is in on state, a driving voltage can be input to the corresponding control electrode through the switching transistor so that the pixel area presents a transparent state, and thus ambient light can enter into the pixel area and be emitted out from the pixel area after being reflected by the reflective film.

Thus, the existing reflective display controls whether or not a pixel unit is to perform display by means of a switching transistor. However, applicants found that since fabricating process of the switching transistor is complicated and the cost thereof is high, the overall production cycle of the existing reflective display is long and the cost thereof is relatively high.

The present disclosure provides a reflective display panel, a driving method thereof, a control method of a pixel unit and a reflective display device, and breaks the limitation that the existing reflective display panel can only depend on a switching transistor to control on/off state of a pixel unit.

Figure 1:
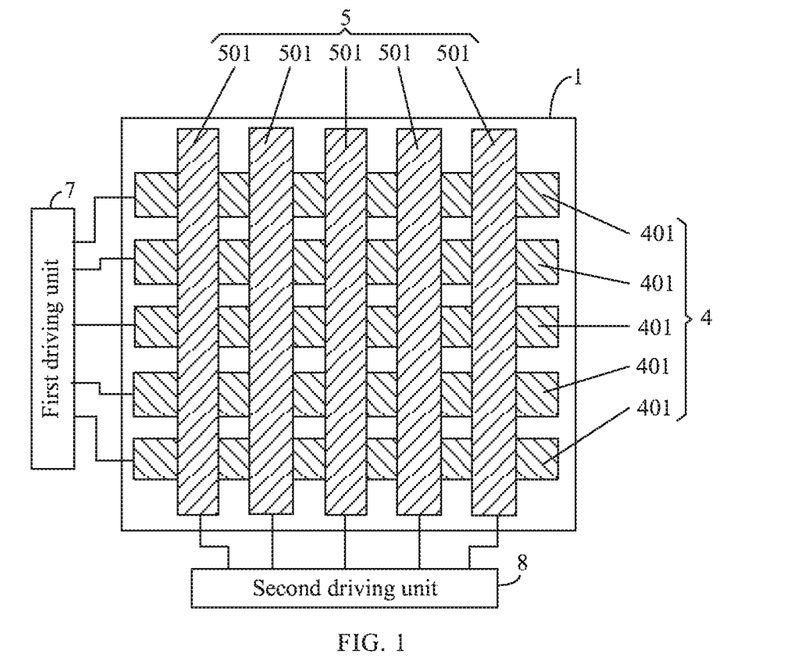
FIG. 1 is a top view of a reflective display panel in an embodiment of the present disclosure.
Figure 2:
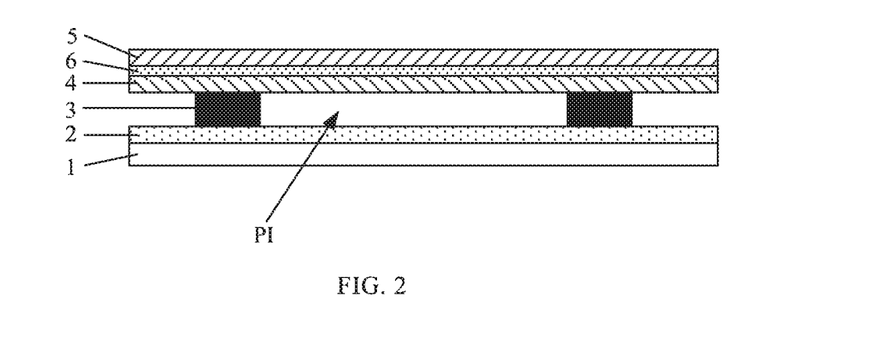
FIG. 2 is a schematic cross-sectional view of one pixel unit in FIG. 1.

In one aspect, embodiments of the present disclosure provide a reflective display panel. FIG. 1 is a top view of a reflective display panel in an embodiment of the present disclosure, and FIG. 2 is a schematic cross-sectional view of one pixel unit in FIG. 1. As shown in FIGS. 1 and 2, the reflective display panel includes: a base substrate 1, a reflective layer 2, a pixel define layer 3, a first electrode layer 4 and a second electrode layer 5, wherein the reflective layer 2 is on a side of the base substrate 1; the pixel define layer 3 is on a side of the reflective layer 2 distal to the base substrate 1 and defines a plurality of pixel units PI; the first electrode layer 4 is on a side of the pixel define layer 3 distal to the base substrate 1, and a material of the first electrode layer 4 is an electro-optic material; the second electrode layer 5 is on a side of the first electrode layer 4 distal to the base substrate 1 and insulated from the first electrode layer 4, and a material of the second electrode layer 5 is an electro-optic material, and an orthogonal projection of the second electrode layer 5 on the base substrate 1 and an orthogonal projection of the first electrode layer 4 on the base substrate 1 overlap to form overlapping areas, the overlapping areas being provided correspondingly to the pixel units PI.

It should be noted that the electro-optic material in the embodiments of the present disclosure refers to an optically functional material having the electro-optic effect, and a refractive index of the electro-optical material changes as a voltage applied thereon changes. Optionally, the material of the first electrode layer includes at least one of lithium niobate ($LiNbO_3$) and gallium arsenide (GaAs), and the material of the second electrode layer includes at least one of lithium niobate and gallium arsenide.

It should also be noted that, the phrase of "the overlapping areas being provided correspondingly to the pixel units PI" in the embodiments of the present disclosure means that projections of the overlapping areas on the base substrate 1 substantially overlap with projections of the pixel units PI on the base substrate 1.

In an embodiment of the present disclosure, in order to ensure insulation between the first electrode layer 4 and the second electrode layer 5, an insulating layer 6 may be provided between the first electrode layer 4 and the second electrode layer 5.

In the reflective display panel provided in the embodiments, whether a pixel unit PI performs display can be controlled by parts of the first electrode layer 4 and the second electrode layer 5 corresponding to the pixel unit PI (i.e., parts of the first electrode layer 4 and the second electrode layer 5 in the overlapping area corresponding to the pixel unit PI). In order that those skilled in the art can better understand the present disclosure, descriptions will be given below in conjunction with the accompanying drawings for illustrative purpose.

Figure 3:
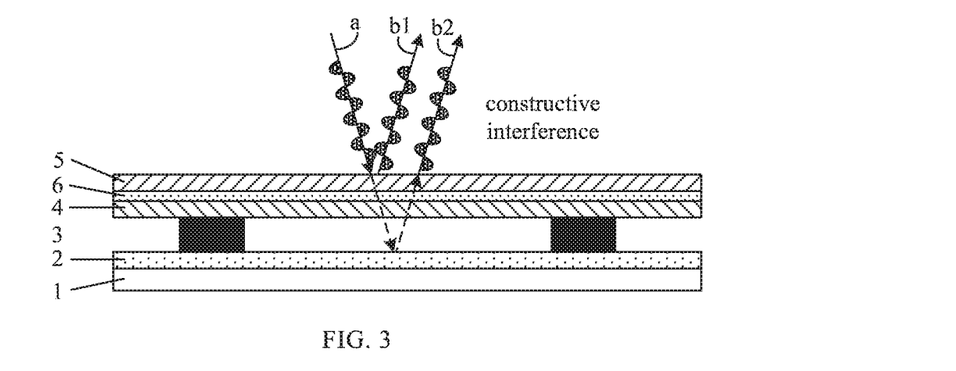
FIG. 3 is a schematic diagram of a pixel unit in on state in an embodiment of the present disclosure.
Figure 4:
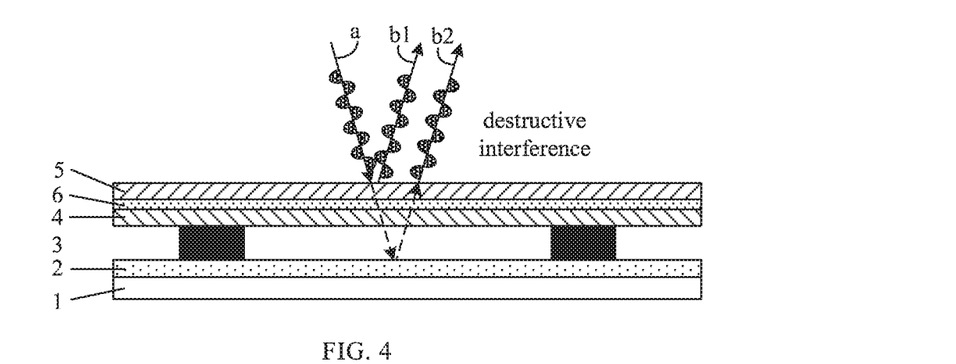
FIG. 4 is a schematic diagram of a pixel unit in off state in an embodiment of the present disclosure.

FIG. 3 is a schematic diagram of a pixel unit in on state in an embodiment of the present disclosure, and FIG. 4 is a schematic diagram of a pixel unit in off state in an embodiment of the present disclosure. As shown in FIGS. 3 and 4, in an embodiment, assuming that ambient light a has an initial phase when reaching an upper surface of the second electrode layer 5, and the pixel unit PI is in normally on mode, in which the pixel unit PI is in on state when no driving voltages are applied to the parts of the first electrode layer 4 and the second electrode layer 5 corresponding to the pixel unit PI, a user can observe light emitted out of the pixel unit PI.

It should be noted that the "upper surface" and "lower surface" in the embodiments are described with reference to the accompanying drawings, and do not constitute limitations to the technical solutions of the present disclosure.

As shown in FIG. 3, when no driving voltages are applied to the parts of the first electrode layer 4 and the second electrode layer 5 corresponding to the pixel unit PI, part of ambient light a is reflected on an upper surface of the part of the second electrode layer 5 corresponding to the pixel unit PI to produce reflected light b1 having a first phase (half-wave loss occurs when light is emitted towards an optically denser medium from an optically thinner medium and reflected at an interface between the two mediums, i.e., a phase difference between the first phase and the initial phase is $\pi/2$); another part of ambient light a is refracted at the upper surface of the second electrode layer 5, directed to the reflective layer after transmitting through the first electrode layer 4, directed to the first electrode layer 4 after being reflected by the reflective layer, and refracted out from the upper surface of the second electrode layer 5, and in this case, refracted light b2 refracted out from the upper surface of the second electrode layer 5 has a second phase. To implement normally on mode, thicknesses of the first electrode layer 4, the second electrode layer 5 and the pixel define layer 3 may be set accordingly through experiments in advance, so that the phase difference between the first phase and the second phase is an even multiple of $\pi$. That is, constructive interference occurs between the reflected light b1 reflected from the upper surface of the second electrode layer 5 and the refracted light b2 refracted out from the upper surface of the second electrode layer 5, and in this case, a user can observe that light is emitted out of the pixel unit PI.

It should be noted that the pixel define layer 3 of the embodiments is generally made of a light-blocking material (e.g., a black resin material) to prevent light from traveling from one pixel unit PI to another pixel unit PI within the reflective display panel.

Referring to FIG. 4, when driving voltages are applied to the parts of the first electrode layer 4 and the second electrode layer 5 corresponding to the pixel unit PI, ambient light a irradiates onto the upper surface of the second electrode layer 5, and part of ambient light a is reflected at the upper surface of the part of the second electrode layer 5 corresponding to the pixel unit PI to form reflected light b1 having a first phase (as in the case where no driving voltages are applied to the first electrode layer 4 and the second electrode layer 5, a phase difference between the first phase and the initial phase is $\pi/2$). However, since materials of both the first electrode layer 4 and the second electrode layer 5 are electro-optic material(s), refractive indices of the first electrode layer 4 and the second electrode layer 5 change, and in this case, a change in the phase of light caused by the first electrode layer 4 and the second electrode layer 5 is different from the change in the phase of light in the case where no driving voltages are applied to the first electrode layer 4 and the second electrode layer 5. Therefore, another part of ambient light a is refracted at the upper surface of the part of the second electrode layer 5 corresponding to the pixel unit PI, emitted to the reflective layer after transmitting through the first electrode layer 4, emitted to the first electrode layer 4 after being reflected by the reflective layer, and refracted out from the upper surface of the second electrode layer 5, and in this case, refracted light b2 refracted out from the upper surface of the second electrode layer 5 has a third phase different from the second phase. Under a condition that the thicknesses of the first electrode layer 4, the second electrode layer 5 and the pixel define layer 3 are all fixed, the third phase can be adjusted by adjusting the first driving voltage applied to the first electrode layer 4 and the second driving voltage applied to the second electrode layer 5. Specifically, to switch off the pixel unit PI, a proper first driving voltage and a proper second driving voltage are chosen to cause the phase difference between the third phase and the first phase to be an odd multiple of $\pi$. That is, destructive interference occurs between the reflected light b1 reflected from the upper surface of the second electrode layer 5 and the refracted light b2 refracted out front the upper surface of the second electrode layer 5, and in this case, a user cannot observe light emitted out of the pixel unit PI.

It should be noted that the first driving voltage applied to the first electrode layer 4 and the second driving voltage applied to the second electrode layer 5 in order to switch off the pixel unit PI can be obtained through experiments in advance.

In addition, the above case where the pixel unit PI is in normally on mode is merely for illustrative purpose and not intended to limit the technical solutions of the present disclosure. In the present disclosure, the pixel unit PI may in normally off mode, in which the pixel unit PI is in off state when no driving voltages are applied to the parts of the first electrode layer 4 and the second electrode layer 5 corresponding to the pixel unit PI, and a user cannot observe that light is emitted out of the pixel unit PI. In this case, it just needs to set the thicknesses of the first electrode layer 4, the second electrode layer 5 and the pixel define layer 3 accordingly through experiments in advance, so that when no driving voltages are applied to the parts of the first electrode layer 4 and the second electrode layer 5 corresponding to the pixel unit PI, the phase difference between the reflected light b1 reflected from the upper surface of the second electrode layer 5 and the refracted light b2 refracted out from the upper surface of the second electrode layer 5 is an odd multiple of $\pi$, thus destructive interference occurs, and a user cannot observe light emitted out of the pixel unit PI. In the meanwhile, in order that the pixel unit PI is in on state when applied with driving voltages, a proper first driving voltage and a proper second driving voltage can be chosen through preset experiments, so that the phase difference between the reflected light b1 reflected from the upper surface of the second electrode layer 5 and the refracted light b2 refracted out from the upper surface of the second electrode layer 5 is an odd multiple of π when the first driving voltage is applied to the first electrode layer 4 and the second driving voltage is applied to the second electrode layer 5, thus constructive interference occurs, and a user can observe that light is emitted out of the pixel unit PI.

As can be seen from the above contents, the reflective display panel of the embodiments of the present disclosure can control the phase of the refracted light b2 refracted out from the surface of the second electrode layer 5 by using the parts of the first electrode layer 4 and the second electrode layer 5 corresponding to the pixel unit PI (i.e., by controlling the first driving voltage and the second driving voltage corresponding to the parts) to thus control whether the pixel unit PI is in on state or off state, without providing a switching transistor. Compared with the prior art, the reflective display panel provided by the embodiments of the present disclosure has simplified structure and fabricating process, shortened production cycle and lowered production cost.

Optionally, as shown in FIG. 1, the reflective display panel further includes: a first driving unit 7 and a second driving unit 8. The first driving unit 7 is connected to the first electrode layer 4 and configured to output the first driving voltage to the first electrode layer 4. The second driving unit 8 is connected to the second electrode layer 5 and configured to output the second driving voltage to the second electrode layer 5. The first driving voltage and the second driving voltage may be set according to practical conditions.

Optionally, as shown in FIG. 1, the first electrode layer 4 includes a number of first strip-like electrodes 401 parallel to each other, the second electrode layer 5 includes a number of second strip-like electrodes 501 parallel to each other, the first strip-like electrodes 401 intersect with the second strip-like electrodes 501, and overlapping areas of the first strip-like electrodes 401 and the second strip-like electrodes 501 correspond to the pixel units PI. The case where the first electrode layer 4 includes a number of first strip-like electrodes 401 and the second electrode layer 5 includes a number of second strip-like electrodes 501 in the embodiments can facilitate control of operation state of a single pixel unit PI in the reflective display panel.

Figure 5:
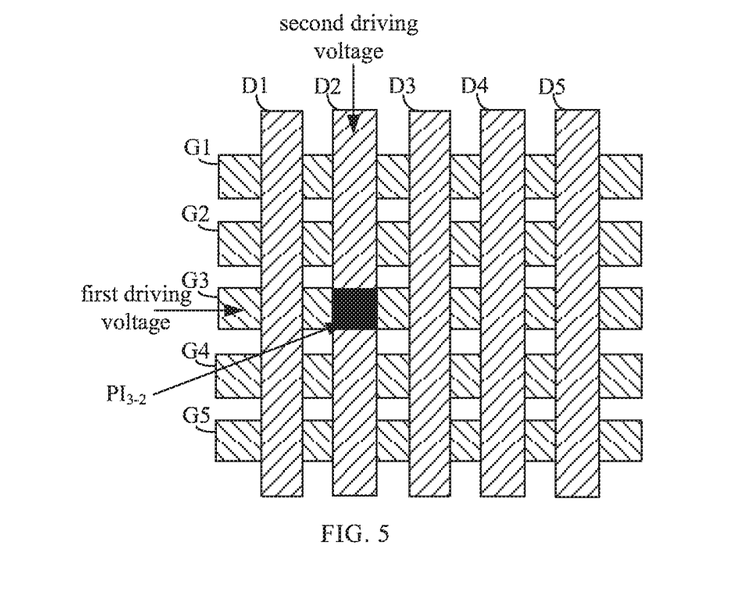
FIG. 5 is a schematic diagram of controlling the pixel unit in the third row and second column to switch operation state in an embodiment of the present disclosure.

FIG. 5 is a schematic diagram of controlling the pixel unit in the third row and second column to switch operation state in an embodiment of the present disclosure. As shown in FIG. 5, it is assumed that the reflective display panel includes 25 (5*5) pixel units PI each being in normally on state, and in this case the number of the first strip-like electrodes G1 to G5 and the number of the second strip-like electrodes D1 to D5 are both five. In a case where no driving voltages are applied to the first strip-like electrode G3 and the second strip-like electrode D2 corresponding to the pixel unit $PI_{3-2}$ in the third row and second column, the pixel unit $PI_{3-2}$ is in on state (a phase difference between reflected light reflected from the upper surface of the second strip-like electrode D2 corresponding to the pixel unit $PI_{3-2}$ and the refracted light refracted out from said upper surface is an even multiple of π), and thus, a user can observe light emitted out of the pixel unit $PI_{3-2}$.

To switch the state of the pixel unit $PI_{3-2}$ into off state, a first driving voltage may be applied to the first strip-like electrode G3 by the first driving unit 7, and a second driving voltage may be applied to the second strip-like electrode D2 by the second driving unit 8, so that the phase of refracted light refracted out from the upper surface of the second strip-like electrode D2 corresponding to the pixel unit $PI_{3-2}$ is changed, and the phase difference between reflected light reflected from the upper surface of the second strip-like electrode D2 corresponding to the pixel unit $PI_{3-2}$ and the refracted light refracted from said upper surface is an odd multiple of π to generate destructive interference. At this point, the pixel unit $PI_{3-2}$ is switched into off state, and a user cannot observe light emitted out of the pixel unit $PI_{3-2}$.

It should be noted that, since the first driving voltage is applied to the first strip-like electrode G3, phases of refracted light refracted out from upper surfaces of the second strip-like electrodes D1, D3, D4 and D5 respectively corresponding to the pixel units in the third row and first column, the third row and third column, the third row and fourth column, and the third row and fifth column (the second strip-like electrodes D1, D3, D4 and D5 are not applied with the second driving voltage) change correspondingly. To prevent these pixel units from being turned off by mistake, a value of the first driving voltage corresponding to the first strip-like electrode G3 may be set through experiments in advance, so as to ensure that destructive interference will not occur between refracted light and reflected light from the upper surfaces of parts of the second strip-like electrodes D1, D3, D4 and D5 corresponding to the pixel units when the first driving voltage is applied to the first strip-like electrode G3 corresponding to these pixel units and the second driving voltage is not applied to the second strip-like electrodes D1, D3, D4 and D5 corresponding thereto. In this case, these pixel units may emit light having intensity smaller than or equal to intensity of light during normal display. For a user, these pixel units are still in on state.

Similarly, in order to prevent the pixel units in the first row and second column, the second row and second column, the fourth row and second column, and the fifth row and second column from being turned off by mistake, a value of the second driving voltage corresponding to the second strip-like electrode D2 may be set through experiments in advance, so as to ensure that destructive interference will not occur between refracted light and reflected light from the upper surfaces of parts of the second strip-like electrode D2 corresponding to these pixel units when the first driving voltage is not applied to the first strip-like electrodes G1, G2, G4 and G5 corresponding to these pixel units and the second driving voltage is applied to the second strip-like electrode D2 corresponding thereto. In this case, these pixel units may emit light having intensity smaller than or equal to intensity of light during normal display. For a user, these pixel units are still in on state.

In this way, switching only the pixel unit $PI_{3-2}$ in the third row and second column into off state can be achieved. Needless to say, if it needs to switch the pixel unit $PI_{3-2}$ in the third row and second column into on state front off state, it only needs to remove the driving voltages applied onto the first strip-like electrode G3 and the second strip-like electrode D2.

From the above, in the present disclosure, by setting a proper first driving voltage and a proper second driving voltage, when only one of the first strip-like electrode 401 and the second strip-like electrode 501 corresponding to a pixel unit PI is applied with the driving voltage, the pixel unit PI is in the same operation state as when both the first strip-like electrode 401 and the second strip-like electrode 501 corresponding thereto are not applied with the driving voltages, whereas when both the first strip-like electrode 401 and the second strip-like electrode 501 corresponding to the pixel unit PI are applied with the driving voltages, the pixel unit PI is in an operation state different from the operation state when both the first strip-like electrode 401 and the second strip-like electrode 501 corresponding thereto are not applied with the driving voltages.

Further optionally, the first strip-like electrodes 401 and the second strip-like electrodes 501 are perpendicular to each other.

It should be noted that the case in which the reflective display panel includes 25 (5*5) pixel units PI, and the number of the first strip-like electrodes and the number of the second strip-like electrodes are both five is only for illustrative purpose, and not intended to limit the technical solutions of the present disclosure.

In another aspect, the embodiments of the present disclosure provide a reflective display device including a reflective display panel, the reflective display panel is the one provided in the present disclosure, and specific contents thereof may refer to the description in the above embodiments and are not repeated herein.

Figure 6:
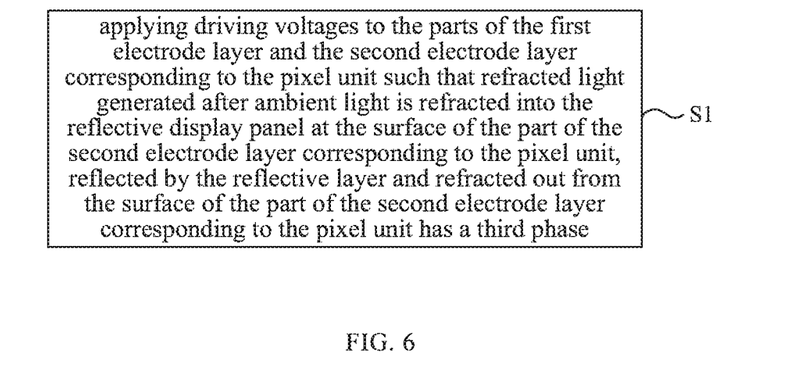
FIG. 6 is a flow chart of a control method of a pixel unit in a reflective display panel in an embodiment of the present disclosure.

In another aspect, the embodiments of the present disclosure provide a control method of a pixel unit in a reflective display panel FIG. 6 is a flowchart of a control method of a pixel unit in a reflective display panel provided, by an embodiment of the present disclosure. As shown in FIG. 6, the reflective display panel is the one described in the present disclosure, and has a specific structure as described in the above embodiments. As described above, reflected light having a first phase is generated after part of ambient light is reflected by a surface of a part of the second electrode layer corresponding to the pixel unit; and when parts of the first electrode layer and the second electrode layer corresponding to the pixel unit are applied with no driving voltages, refracted light having a second phase is generated after part of ambient light is refracted into the reflective display panel at the surface of the part of the second electrode layer corresponding to the pixel unit, reflected by the reflective layer and refracted out from the surface of the part of the second electrode layer corresponding to the pixel unit, the first phase and the second phase having a first phase difference therebetween. The control method of a pixel unit in the reflective display panel includes:

step S1: applying driving voltages to the parts of the first electrode layer and the second electrode layer corresponding to the pixel unit such that a refracted light having a third phase is generated after part of ambient light is refracted into the reflective display panel at the surface of the part of the second electrode layer corresponding to the pixel unit, reflected by the reflective layer and refracted out from the surface of the part of the second electrode layer corresponding to the pixel unit, wherein the first phase and the third phase has a second phase difference therebetween, and one of the first phase difference and the second phase difference is an odd multiple of $\pi$, and the other is an even multiple of $\pi$.

In the present embodiment, if the pixel unit is in normally on mode, the first phase difference is an even multiple of $\pi$ (constructive interference occurs), and the second phase difference is an odd multiple of $\pi$ (destructive interference occurs), and thus the pixel unit can be switched from on state into off state by the above control method. If the pixel unit is in normally off mode, the first phase difference is an odd multiple of $\pi$ (destructive interference occurs), and the second phase difference is an even multiple of $\pi$ (constructive interference occurs), and thus the pixel unit can be switched from off state into on state by the above control method. Specific principle may refer to the corresponding contents in the above embodiments and is not repeated therein.

It should be noted that, the control method according to the embodiments of the present disclosure may also achieve simultaneous control of states of multiple pixel units.

In some embodiments, the first electrode layer includes a number of first strip-like electrodes parallel to each other, the second electrode layer includes a number of second strip-like electrodes parallel to each other, and the first strip-like electrodes intersect with the second strip-like electrodes.

In some embodiments, a first driving voltage may be applied to one of the first strip-like electrodes, a second driving voltage may be applied to each of the second strip-like electrodes at the same time, and in this way, operation state of each of the pixel units corresponding to the one first strip-like electrode can be switched.

Needless to say, the above case in which operation state of each of the pixel units corresponding to one first strip-like electrode is switched is only for illustrative purpose. In the present disclosure, driving voltages may be applied simultaneously to at least one first strip-like electrode and at least one second strip-like electrode as practically required, so as to switch the operation state of the corresponding pixel unit(s).

Figure 7:
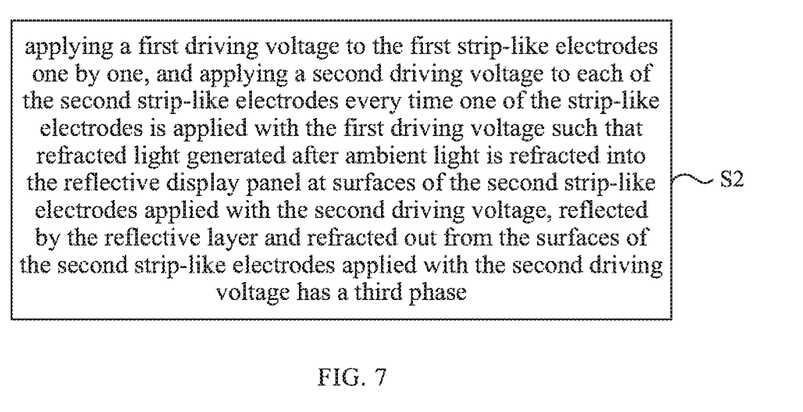
FIG. 7 is a flow chart of a driving method of a reflective display panel in an embodiment of the present disclosure.

In another aspect, the embodiments of the present disclosure further provide a driving method of a reflective display panel. FIG. 7 is a flowchart of a driving method of a reflective display panel in an embodiment of the present disclosure. As shown in FIG. 7, the reflective display panel is the one described in the present disclosure, the first electrode layer includes a number of first strip-like electrodes parallel to each other, the second electrode layer includes a number of second strip-like electrodes parallel to each other, and the first strip-like electrodes intersect with the second strip-like electrodes. Moreover, reflected light having a first phase is generated after part of ambient light is reflected by a surface of the second electrode layer; and when parts of the first electrode layer and the second electrode layer corresponding to the pixel unit are applied with no driving voltages, refracted light having a second phase is generated after part of ambient light is refracted into the reflective display panel at the surface of the second electrode layer, reflected by the reflective layer and refracted out from the second electrode layer, the first phase and the second phase having a first phase difference therebetween. The driving method of the reflective display panel includes:

step S2: applying a first driving voltage to the first strip-like electrodes one by one, and applying a second driving voltage to each of the second strip-like electrodes every time one of the first strip-like electrodes is applied with the first driving voltage such that refracted light having a third phase is generated after part of ambient light is refracted into the reflective display panel at surfaces of the second strip-like electrodes applied with the second driving voltage, reflected by the reflective layer and refracted out from the surfaces of the second strip-like electrodes applied with the second driving voltage;

wherein the first phase and the third phase have a second phase difference therebetween, one of the first phase difference and the second phase difference is an odd multiple of $\pi$, and the other is an even multiple of $\pi$.

The case where each pixel unit of the reflective display panel is in normally on mode is taken as an example, that is, the first phase difference between the first phase and the second phase is an even multiple of $\pi$. When the first driving voltage is applied to one of the first strip-like electrodes and the second driving voltage is applied to each of the second strip-like electrodes, the second phase difference between the first phase and the third phase is an odd multiple of π, and thus each of the pixel units corresponding to the first strip-like electrode will be switched into off state. In the present embodiment, by driving the first strip-like electrodes one by one, on/off states of the pixel units corresponding to each of the first strip-like electrodes is controlled, and finally on/off control of each pixel unit on the entire reflective display panel is achieved.

As can be seen from the above contents, the driving method according to the embodiment of the present disclosure can achieve control of operation state of the entire reflective display panel.

In a case where each pixel unit on the reflective display panel is in normally off mode, the first phase difference between the first phase and the second phase is an odd multiple of π, and the second phase difference between the first phase and the third phase can be set to an even multiple of π by the above driving method, thus achieving on/off control of each pixel unit on the entire reflective display panel. Specific process is not repeated herein.

It should be understood that the above implementations are merely exemplary implementations adopted for explaining the principle of the present disclosure, but the present disclosure is not limited thereto. For those skilled in the art, various modifications and improvements may be made without departing front the spirit and essence of the present disclosure, and these modifications and improvements are also considered to be within the protection scope of the present disclosure.

The invention claimed is:

1. A reflective display panel, having a plurality of pixel units and comprising:
    a base substrate;
    a reflective layer on a side of the base substrate;
    a first electrode layer on a side of the reflective layer distal to the base substrate, a material of the first electrode layer being an electro-optic material of which a refractive index changes as a voltage applied thereon changes; and
    a second electrode layer on a side of the first electrode layer distal to the base substrate and insulated from the first electrode layer, a material of the second electrode layer being an electro-optic material of which a refractive index changes as a voltage applied thereon changes, wherein an orthogonal projection of the second electrode layer on the base substrate and an orthogonal projection of the first electrode layer on the base substrate overlap to form overlapping areas each corresponding to one of the plurality of pixel units.

2. The reflective display panel according to claim 1, wherein the first electrode layer comprises a number of first strip-like electrodes parallel to each other;
    the second electrode layer comprises a number of second strip-like electrodes parallel to each other; and
    the first strip-like electrodes intersect with the second strip-like electrodes.

3. The reflective display panel according to claim 2, wherein the first strip-like electrodes are perpendicular to the second strip-like electrodes.

4. A driving method of a reflective display panel, wherein the reflective display panel is the reflective display panel according to claim 2,
    reflected light generated after part of ambient light is reflected by a surface of the second electrode layer has a first phase;
    when parts of the first electrode layer and the second electrode layer corresponding to the pixel unit are applied with no driving voltages, refracted light generated after part of ambient light is refracted into the reflective display panel at the surface of the second electrode layer, reflected by the reflective layer and refracted out from the second electrode layer has a second phase, the first phase and the second phase having a first phase difference therebetween;
    the driving method of the reflective display panel comprises:
    applying a first driving voltage to the first strip-like electrodes one by one, and applying a second driving voltage to each of the second strip-like electrodes every time one of the strip-like electrodes is applied with the first driving voltage such that refracted light generated after part of ambient light is refracted into the reflective display panel at surfaces of the second strip-like electrodes applied with the second driving voltage, reflected by the reflective layer and refracted out from the surfaces of the second strip-like electrodes applied with the second driving voltage has a third phase, the first phase and the third phase having a second phase difference therebetween;
    wherein one of the first phase difference and the second phase difference is an odd multiple of π, and the other of the first phase difference and the second phase difference is an even multiple of π.

5. The reflective display panel according to claim 1, further comprising:
    a first driving unit connected to the first electrode layer and configured to output a first driving voltage to the first electrode layer; and
    a second driving unit connected to the second electrode layer and configured to output a second driving voltage to the second electrode layer.

6. The reflective display panel according to claim 1, wherein the material of the first electrode layer comprises at least one of lithium niobate and gallium arsenide.

7. The reflective display panel according to claim 1, wherein the material of the second electrode layer comprises at least one of lithium niobate and gallium arsenide.

8. The reflective display panel according to claim 1, further comprising an insulating layer between the first electrode layer and the second electrode layer.

9. The reflective display panel according to claim 1, further comprising a pixel define layer on a side of the reflective layer distal to the base substrate, the pixel define layer defining the plurality of pixel units.

10. The reflective display panel according to claim 9, wherein for each of the plurality of pixel units, when parts of the first electrode layer and the second electrode layer corresponding to the pixel unit are applied with no driving voltages, reflected light generated after part of ambient light is reflected by a surface of the part of the second electrode layer corresponding to the pixel unit has a first phase, and refracted light generated after part of ambient light is refracted into the reflective display panel at the surface of the part of the second electrode layer corresponding to the pixel unit, reflected by the reflective layer and refracted out from the surface of the part of the second electrode layer corresponding to the pixel unit has a second phase, and
    thicknesses of the first electrode layer, the second electrode layer and the pixel define layer are set such that a phase difference between the first phase and the second phase is an even multiple of π.

11. The reflective display panel according to claim 9, wherein for each of the plurality of pixel units, when parts of the first electrode layer and the second electrode layer corresponding to the pixel unit are applied with no driving voltages, reflected light generated after part of ambient light is reflected by a surface of the part of the second electrode layer corresponding to the pixel unit has a first phase, and refracted light generated after part of ambient light is refracted into the reflective display panel at the surface of the part of the second electrode layer corresponding to the pixel unit, reflected by the reflective layer and refracted out from the surface of the part of the second electrode layer corresponding to the pixel unit has a second phase, and thicknesses of the first electrode layer, the second electrode layer and the pixel define layer are set such that a phase difference between the first phase and the second phase is an odd multiple of $\pi$.

12. A reflective display device, comprising the reflective display panel according to claim 1.

13. A control method of a pixel unit in a reflective display panel, the reflective display panel being the reflective display panel according to claim 1, wherein for any pixel unit in the reflective display panel, reflected light generated after part of ambient light is reflected by a surface of a part of the second electrode layer corresponding to the pixel unit has a first phase; and when a part of the first electrode layer corresponding to the pixel unit and the part of the second electrode layer corresponding to the pixel unit are applied with no driving voltages, refracted light generated after part of ambient light is refracted into the reflective display panel at the surface of the part of the second electrode layer corresponding to the pixel unit, reflected by the reflective layer and refracted out from the surface of the part of the second electrode layer corresponding to the pixel unit has a second phase, the first phase and the second phase having a first phase difference therebetween; and the control method of a pixel unit comprises:

applying driving voltages to the parts of the first electrode layer and the second electrode layer corresponding to the pixel unit such that refracted light generated after part of ambient light is refracted into the reflective display panel at the surface of the part of the second electrode layer corresponding to the pixel unit, reflected by the reflective layer and refracted out from the surface of the part of the second electrode layer corresponding to the pixel unit has a third phase, the first phase and the third phase having a second phase difference therebetween;

wherein one of the first phase difference and the second phase difference is an odd multiple of $\pi$, and the other of the first phase difference and the second phase difference is an even multiple of $\pi$.

* * * * *